Dec. 5, 1944.  G. G. FREDERICHS  2,364,065
GEAR SHAPING MACHINE
Filed May 8, 1941  3 Sheets-Sheet 1
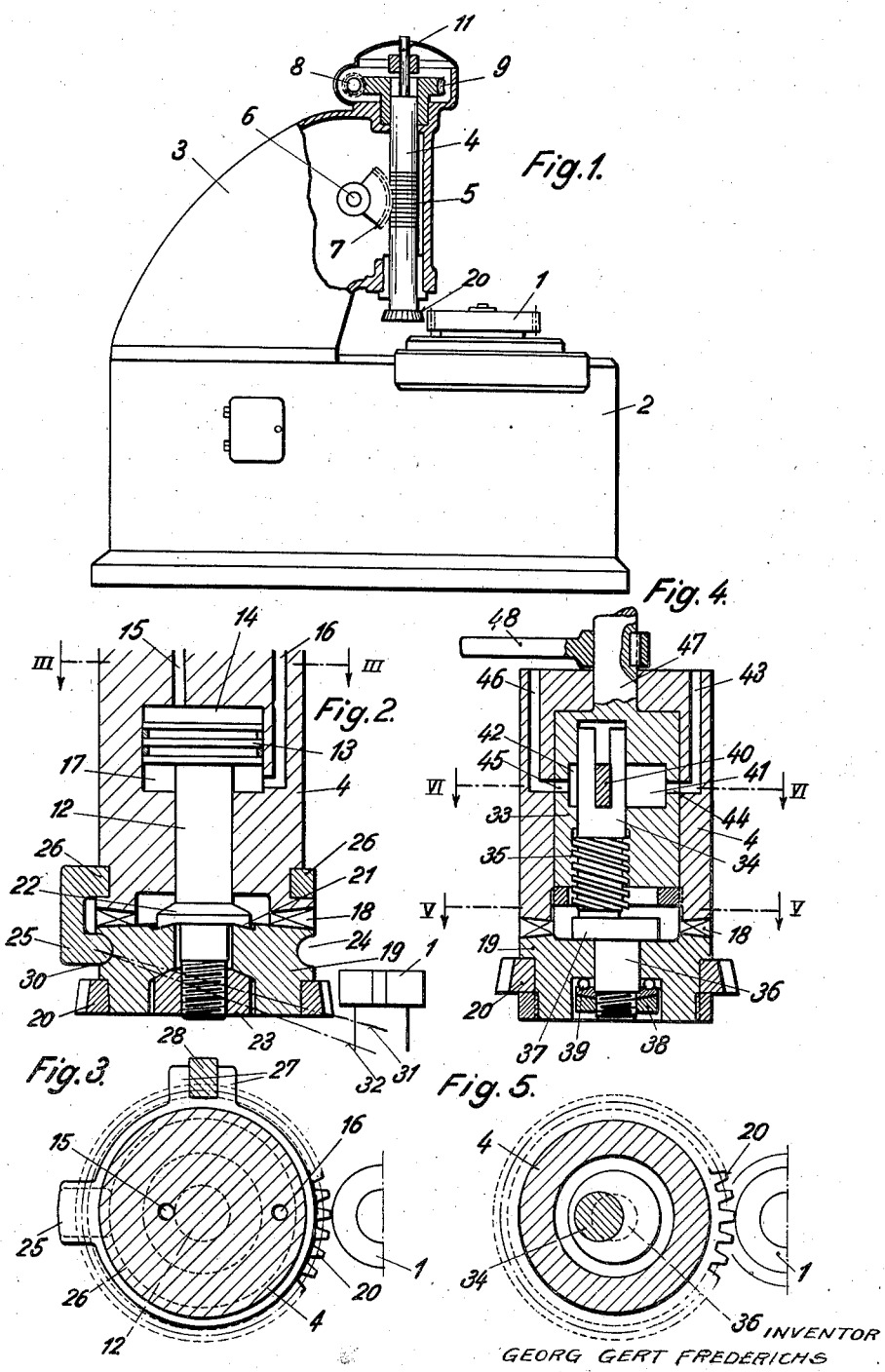
INVENTOR
GEORG GERT FREDERICHS
BY Bailey P Larson
ATTORNEYS Dec. 5, 1944.    G. G. FREDERICHS    2,364,065
GEAR SHAPING MACHINE
Filed May 8, 1941    3 Sheets-Sheet 2
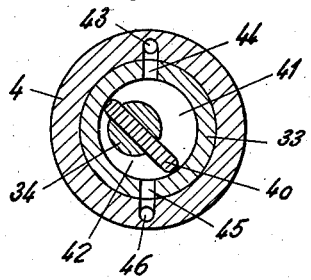
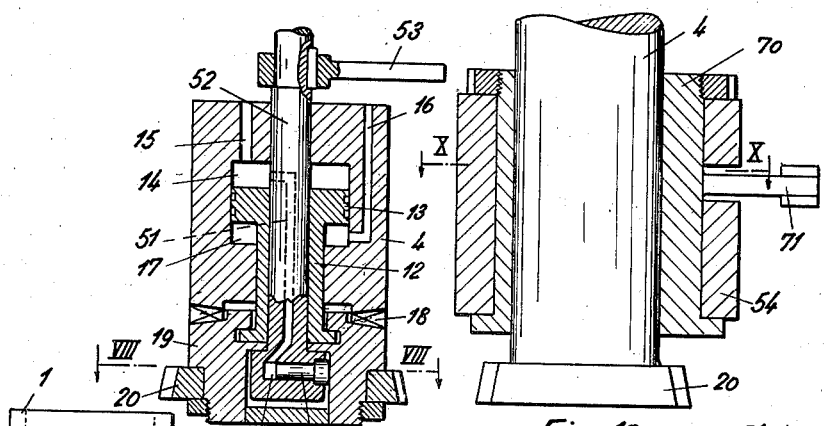
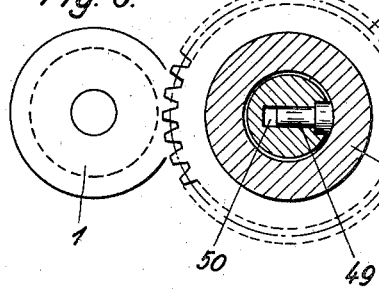
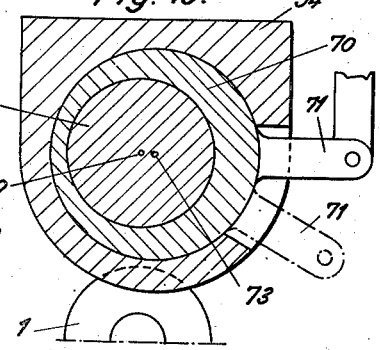
INVENTOR
GEORG GERT FREDERICHS,
BY
ATTORNEYS Dec. 5, 1944.  G. G. FREDERICHS  2,364,065
GEAR SHAPING MACHINE
Filed May 8, 1941   3 Sheets-Sheet 3

INVENTOR
GEORG GERT FREDERICHS
BY Bailey P. Parson
ATTORNEYS

Patented Dec. 5, 1944

2,364,065

UNITED STATES PATENT OFFICE 2,364,065

GEAR SHAPING MACHINE

Georg Gert Frederichs, Kassel-Brasselsberg, Germany; vested in the Alien Property Custodian Application May 8, 1941, Serial No. 392,532
In Germany December 12, 1939

2 Claims. (Cl. 90—7)

My invention relates to machines for shaping gears by the conjoint relative reciprocation and rotation of the work piece and the tool, in which machines the tool is on its return stroke disengaged from the work piece.

In the known machines of the said class either the tool spindle together with the cutter and the spindle carrier or the whole work supporting table together with the work piece must be withdrawn, and by the short and rapid movements of the heavy spindle carrier or of the supporting table the machinery is subjected to violent shocks which have an unfavourable influence on the cleanliness and exactness of the work. Moreover bulky driving means are necessary for the said movements, which means are highly subjected to wear and require much power. It is especially difficult to fix the heavy supporting table at each shaping stroke.

The object of my invention is to eliminate the said drawbacks by disengaging the tool from the work piece in such a way that the cutter is moved relatively to the tool spindle, or that the tool spindle together with the cutter is moved relatively to the spindle carrier. By this arrangement it is rendered possible to use two cutting tools, of which the one performs the roughcutting, whereas the other performs the smoothing. In this way a greater cleanliness and exactness of the toothed work and a longer duration of the cutting edges of the tools are attained.

Other objects of my invention will be apparent from the following specification referring to the drawings. According to a preferred embodiment of my invention the movement of the cutter relatively to the tool spindle is executed with hydraulic means, and an object of my invention is also the exact adjustment of the tool relatively to the work piece.

In the drawings several embodiments of my invention are shown.

Fig. 1 is a side elevation of the gear shaping machine, partly in section.

Fig. 2 is a section through a portion of the tool spindle to which the cutter is articulated.

Fig. 3 is a section through the tool spindle according to the line III—III of Fig. 2.

Fig. 4 shows a modification according to which the cutter is displaced by an eccentric bolt.

Fig. 5 is a section according to the line V—V of Fig. 4.

Fig. 6 is a section according to the line VI—VI of Fig. 4.

Fig. 7 shows an embodiment according to which the cutter is moved relatively to the tool spindle both in the axial and radial direction by means of hydraulically actuated pistons.

Fig. 8 is a section according to the line VIII—VIII of Fig. 7.

Fig. 9 shows a modification according to which the tool spindle together with the cutter is displaced by means of an eccentric socket.

Fig. 10 is a section according to the line X—X of Fig. 9.

Figure 11:
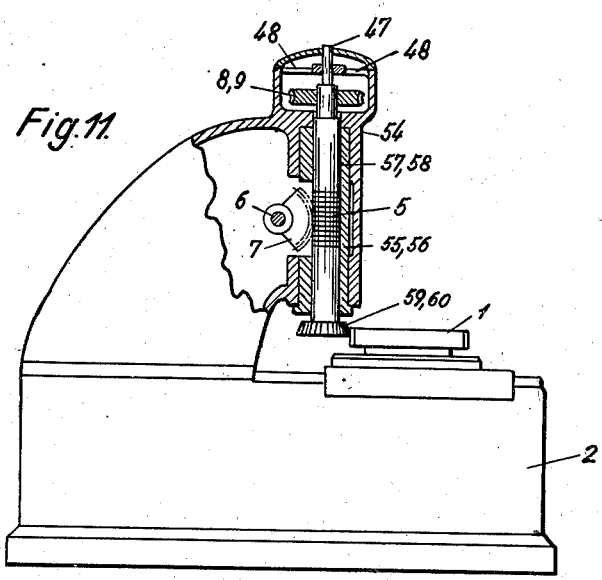
Fig. 11 is a side elevation of a shaping machine with two spindles, partly in section.
Figure 12:
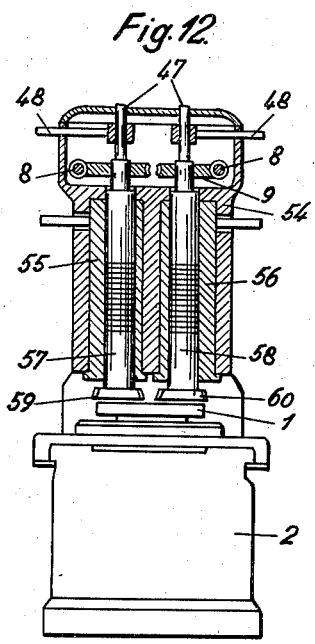
Fig. 12 is a front view of the machine according to Fig. 11, partly in section.
Figure 13:
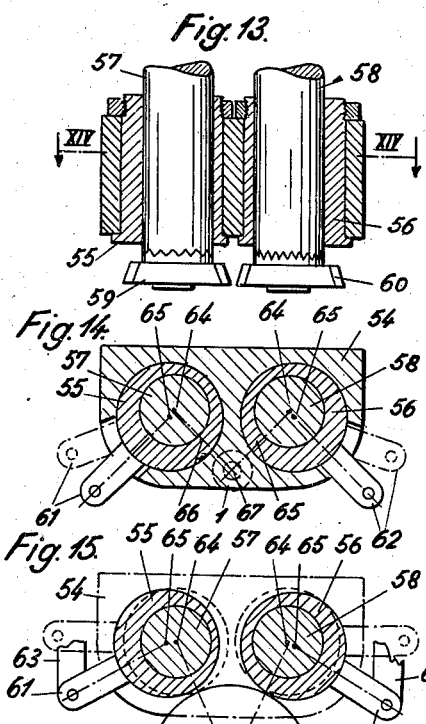
Fig. 13 is an enlarged section of the two tool spindles, partly in section, arranged side by side.

The work piece 1 is framed on the table 2 which is rigidly connected with the spindle carrier 3 in which the tool spindle 4 is guided in vertical and axial direction. The tool spindle has several annular rack-teeth meshing with a toothed sector 7 which is rotatable about the axis 6. By a rotation of the said sector the tool spindle is forced upwards or downwards in a vertical direction. Simultaneously the work piece 1 as well as the tool spindle 4 is rotated. The rotation of the tool spindle is executed by means of the worm 8 and the worm wheel 9. The cutter 20 is articulated to the tool spindle 4.

In the embodiments according to Figs. 2 and 3 a bolt 12 and a piston 13 connected with it is centrically arranged in the spindle 4. The said piston has tight fit in a cylindric bore 14, 17 of the spindle and operates like a hydraulic pressure-piston. The pressure liquid is fed with the necessary pressure through the inlet channels 15 and 16 to the chambers 14 and 17.

The tool spindle is subjected to a reciprocal movement and is provided with a spur cogging 18 meshing with a corresponding cogging of the disc 19 to which the cutter 20 is fastened.

The disc 19 has a convex spherical face 21 which fits into a corresponding spherical concavity 22 of the bolt 12. On the other side a nut 23 is screwed upon the bolt 12.

The disc 19 has an annular recess of semicircular cross-section into which the lower end of hinge 25 fits. The said hinge is attached to a ring 26 set in a groove surrounding the tool spindle 4.

The ring 26 is held against rotation by the ears 27 engaging the rod 28. Correspondingly hinge 25 and the ring 26 remain stationary during the rotation of the tool spindle 4. The hinge 25 is arranged opposite to the cutting teeth of the cutter 20 which are cleared away from the tool spindle only on that side on which the cutting teeth engage the working piece. The cutter is swung downwards by a vertical downward movement of the bolt 12.

The operation of the machine is the following: At the beginning of the vertical working or cutting stroke of the tool spindle 4 the bolt 12 moves upward. Under the influence of corresponding controlling means the pressure liquid is then fed to the lower chamber 17 of the cylinder to force the piston 13 of the bolt 12 upwards. The disc 19 and the cutter are pressed into the spur cogging 18 of the tool spindle 4, so that the said disc 19 is rigidly connected with the tool spindle 4. The purpose of the corresponding spur coggings of the disc 19 and of the tool spindle 4 is (1) that they produce at each cutting or working stroke a rigid connection between the tool spindle 4 and the cutter 20 with the aid of the bolt 12 and (2) that they provide after each stroke for an exact central position of the cutter relatively to the tool spindle.

After the end of the working stroke the pressure liquid is fed through the channel 15 into the upper space 14 of the cylinder, and the bolt 12 is correspondingly pressed downwards, whereupon the disc 19 and the cutting gear 20 are on one side cleared away from the tool spindle 4, so that those teeth of the cutter 20 which made the cut in the work piece 1 on the down stroke of spindle 4 are separated such a distance from the work piece 1 that on the return stroke of the tool spindle and of the cutter 20 the cutting edges of the latter freely pass the work piece 1 without touching the same.

The way along which the oscillatory movement of the cutter 20 about the hinge 25 or the pivot 30 of the hinge 25 takes place must not be more than a few millimeters. In Fig. 2 the line 31 corresponds with the working position of the cutting edge, and the line 32 corresponds with the position according to which the cutting edge is cleared away from the work piece.

According to the modification shown in Figs. 4, 5 and 6 the tool is not tilted downwards on only one side but retains its horizontal position during its movements relatively to the tool spindle. Also here the tool spindle 4 has a spur cogging 18 which is engaged by a corresponding counter-cogging of the disc 19 for the cutter 20. Inside of the spindle 4 a socket member 33 is rotatable. The said socket member 33 has an eccentric bore in which a bolt 34 is rotatable and axially displaceable. The said bolt 34 is threaded at 35 and has an eccentrically arranged cylindrical stud 36 which is concentric to the spindle 4 and which engages with a concentric bore of the disc 19. The disc is held on the stud at one end of the same by the annular shoulder 37 and at the other end by a nut 38 which engages the disc through the intermediary of a ball bearing 39.

The upper end of the bolt 34 has a slot in which a slide member 40 is inserted the end faces of which are adjacent the walls of a cylindrical chamber 41, 42 in the socket member 33. The member 40 forms a hydraulic rotatable piston which imparts rotation to the bolt 34. Through the slide member the cylindrical chamber is divided into the parts 41 and 42.

The channels 43, 44, 45 and 46 form the inlets to the pressure chambers 41, 42.

The socket member 33 has a central pivot 47 which protrudes through a corresponding bore of the tool spindle 4 to the outside. To the said pivot a lever 48 is keyed which holds the socket during the operation in such a way that the tool spindle 4 is rotatable about the socket member 33. In this way the device for radially displacing the cutter remains immovable.

The operation is as following: At the end of the down cutting stroke, spindle 4 is rotated to bring channel 46 into communication with chamber 42. The pressure liquid enters the chamber 42 and turns the slide-member 40 and with it the bolt 34. Through the intermediary of the threads 35 the bolt 34 is screwed downwards. Simultaneously the eccentric stud 36 gyrates about the axis of the bolt 34, the first turning movement of the bolt causing the disc 19 to move downward relative to cogging 18, and in consequence thereof the disc 19 together with the cutter 20 is cleared away from the cogging 18 of the tool spindle 4. At the same time the cutter is also cleared away in a radial direction from the work piece 1, so that the return stroke of the tool can take place unimpeded by the work piece.

Now the pressure liquid is fed through the channels 43, 44 to the chamber 41. The slide-member 40 and the bolt 34 are now rotated in the opposite direction. In consequence thereof the bolt 34 moves upwards, and the disc 19 is brought into engagement with the spur-cogging 18 of the tool spindle 4. The spindle may then be further rotated, and the cutter 20 is now in position to execute the next following working stroke.

The Figs. 7 and 8 show a construction similar with that of Figs. 2 and 3, as also here the pressure liquid influences a piston 13 which axially displaces the bolt 12. This bolt does not engender a tilting movement of the cutter 20 but displaces the same in the axial direction parallel to itself. The radial displacement of the cutter is here engendered by the piston 49 which is guided in the bore 50 into which the pressure liquid is fed through the channel 51. The channel 51, the bore 50 and the piston 49 are provided in the bolt 52 which is concentrically and rotatably mounted in the bolt 12.

The operation is as following: The pressure liquid is fed to the chamber 14 through the channel 15. The piston together with the bolt 12, the disc 19 and the cutter 20 moves downwards. Simultaneously the pressure liquid is pressed through the channel 51 into the chamber 50. The disc and the cutter which are clear from the cogging are now radially moved away from the work piece 1 by the piston 49. The upward movement of spindle 4 now takes place, with the cutter 20 clearing the work piece. In the uppermost position of the spindle the pressure liquid is fed to the chamber 17 through the channel 16. The piston 13 and the cutter move upwards, and the disc is again brought into engagement with the cogging 18 in such a way that the disc is made concentric with the axis of the tool spindle. Piston 49 is forced by disc 19 into its initial position. The cutter is now in the position to execute another working stroke.

In the embodiment according to Figs. 9 and 10 the tool spindle 4 is mounted in the eccentric socket 70 which is arranged in the tool spindle carrier 54. The eccentric socket is rotated by the lever 71. In consequence thereof the centre 72 of the tool spindle gyrates about the centre 73 of the socket, so that at each stroke-end the cutting gear is moved towards the work piece 1 or away from it.

According to the last-mentioned arrangement of the tool relatively to the work piece the masses which have to be moved are greater than in the other construction in which only the cutter is moved relative to the tool spindle. The construction according to Figs. 9 and 10 can be used for machines with only one or with two tool spindles.

With the machines already described the teeth of the work piece are only rough-shaped during the first full rotation of the work piece and a smoothing takes place during a second rotation of the work piece. But according to the construction shown in Figs. 11-15 the rough-shaping and smoothing is executed during a single rotation, so that the double output is attained.

Only the described arrangement of the cutter relative to the tool spindle according to this invention renders it possible to provide two tool spindles, as the work piece must be moved relative to the cutter always in the line from the centre of the work piece to the centre of the cutter.

In the carrier 54 of the two tool spindles two sockets 55, 56 are rotatably mounted and held against axial movement at both ends. In eccentric bores of the said sockets the tool spindles 57, 58 with the cutters 59, 60 are mounted, and are capable of axial and rotary movements. The tool spindles are driven in the axial direction by a toothed sector 7 oscillating about the axis 6 and engaging annular rack teeth 5 on the spindles.

The tool spindles are rotated by means of worms 8 and worm-wheels 9.

With the sockets 55, 56 levers 61, 62 are connected to which rods 63 are articulated. The levers 61, 62 have the purpose to adjust the direction of the clearing movement of the cutter relatively to the work piece, as shown in Figs. 14 and 15.

By rotation of the sockets 55 and 56 which may be clockwise the centres 64 of the tool spindles 57, 58 and of the cutters 59, 60 oscillate about the centres 65 of the sockets. The tool spindles 57 and 58 are displaced from the work piece 1 along a way (Figs. 14 and 15) which corresponds with the angular movements of the levers 61, 62.

Figure 14:
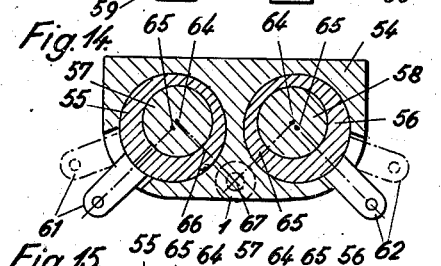
Fig. 14 is a section according to the line XIV—XIV of Fig. 13.
Figure 15:
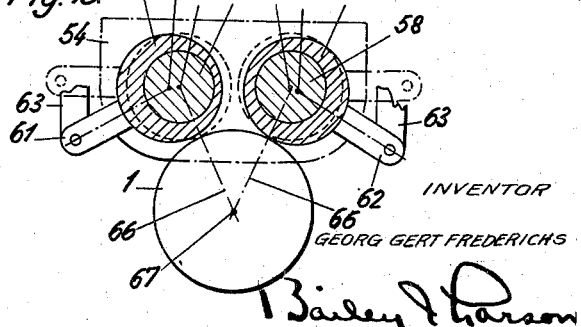
Fig. 15 is also a section according to the line XIV—XIV of Fig. 13 showing the adjustment of the working parts of the machinery relatively to a work piece of large diameter.

The eccentric sockets 55, 56 of the tool spindles 57, 58 may be adjusted in such a way that their reciprocal movements to and from the work piece are always in the direction of the lines 66 connecting the centre 67 of the work piece 1 with the centres 64 of the tools or of the tool spindles, and it is obvious from Figs. 14 and 15 that the direction of the lines 66 connecting the respective centres depends from the diameter of the work piece according to which the starting position of the levers 61, 62 has to be adjusted.

The eccentric sockets also serve for the exact adjustment, especially in the case that after the beginning of the working the depth of the teeth has to be more exactly adjusted within limits of $\tfrac{1}{10}$ millimeter for instance. For this purpose the levers 61 and 62 are brought into a corresponding position which is fixed for the respective working.

It is known that in the operations of cutting, turning and shaping with two tools on a work piece it is not possible to do the rough-working and the smoothing simultaneously. According to my invention the two tools are subjected to mutually reciprocal movements, so that the rough-cutting edge is working, whilst the smooth-cutting edge is on its return and vice-versa.

For this reason the tool has during the smooth-shaping a steady position in which it is not subjected to convulsions, displacements and the like. An exact and clean shaping and a longer duration of the cutting edge is attained in this way.

What I claim and desire to secure by Letters Patent is:

1. In combination, a spindle, a gear cogging at one end of said spindle, a ring engaging said spindle and having a projecting lug with a convex shaped end, a gear cutter having a cogging adapted to engage the spindle cogging and having an annular concave shaped groove into which said convex shaped end of said lug is fitted to form a hinge between said ring and said cutter.

2. In a shaping machine, a spindle, a gear cutter actuated by said spindle, means for moving said spindle and cutter along the longitudinal axis of the spindle, means for rotating the spindle and cutter about the longitudinal axis of the spindle, and hydraulic means disposed within said spindle for displacing said cutter relative to said spindle, said hydraulic means comprising a piston mounted within said spindle, and means securing said cutter to said piston.

GEORG GERT FREDERICHS.